(12) United States Patent
Nagasaki

(10) Patent No.: US 9,611,895 B2
(45) Date of Patent: Apr. 4, 2017

(54) ROLLER ALIGNMENT DEVICE AND ROLLER ALIGNMENT METHOD

(71) Applicant: NSK LTD., Tokyo (JP)

(72) Inventor: Yuuichi Nagasaki, Gunma (JP)

(73) Assignee: NSK LTD., Tokyo (JP)

( * ) Notice: Subject to any disclaimer, the term of this patent is extended or adjusted under 35 U.S.C. 154(b) by 220 days.

(21) Appl. No.: 14/379,779

(22) PCT Filed: Feb. 12, 2013

(86) PCT No.: PCT/JP2013/053262
§ 371 (c)(1),
(2) Date: Aug. 20, 2014

(87) PCT Pub. No.: WO2013/125392
PCT Pub. Date: Aug. 29, 2013

(65) Prior Publication Data
US 2015/0075004 A1    Mar. 19, 2015

(30) Foreign Application Priority Data

Feb. 23, 2012 (JP) .................................. 2012-036995
Feb. 23, 2012 (JP) .................................. 2012-037165

(51) Int. Cl.
*F16C 43/06*   (2006.01)
*F16C 19/26*   (2006.01)
(Continued)

(52) U.S. Cl.
CPC ............ *F16C 43/06* (2013.01); *B23P 19/001* (2013.01); *B23P 19/04* (2013.01); *B23P 21/00* (2013.01);
(Continued)

(58) Field of Classification Search
CPC ........... Y10T 29/49636; Y10T 29/4968; Y10T 29/49682; Y10T 29/49696; Y10T 29/497;
(Continued)

(56) References Cited

U.S. PATENT DOCUMENTS 3,495,755 A * 2/1970 Lake ...................... B23P 19/04
227/130

FOREIGN PATENT DOCUMENTS

JP         4-283032 A     10/1992
JP       H05-329721 A    12/1993
(Continued)

OTHER PUBLICATIONS

Translation of JP2007160414 A.*
(Continued)

*Primary Examiner* — Jason L Vaughan
*Assistant Examiner* — Amanda Meneghini
(74) *Attorney, Agent, or Firm* — Katten Muchin Rosenman LLP

(57) ABSTRACT

An alignment device aligns rollers R in an annular shaped alignment space 24 in parallel to each other while at the same time prevents damage from occurring on rolling surfaces of rollers R. Plural rollers R that are arranged in a row in an axial direction are sequentially supplied into an annular shaped alignment space 24 that is formed in a main jig 14 in a direction that coincides with a width direction of the alignment space 24. The plural rollers R are aligned in an annular shape so as to be in parallel to each other by alignment-fluid-supply means 16 spraying air onto a roller R that is in a supply position in the alignment space 24 from a direction that is orthogonal to the roller R supply direction and moving the roller R in a circumferential direction of the alignment space 24, and then supplying a next roller R into the alignment space 24.

5 Claims, 10 Drawing Sheets

(51) Int. Cl.
  *B23P 19/00*  (2006.01)
  *B23P 19/04*  (2006.01)
  *B23P 21/00*  (2006.01)

(52) U.S. Cl.
  CPC ......... *F16C 19/26* (2013.01); *Y10T 29/49679* (2015.01); *Y10T 29/49682* (2015.01); *Y10T 29/53104* (2015.01)

(58) Field of Classification Search
  CPC ........... Y10T 29/53104; Y10T 29/5383; Y10T 29/53961; Y10T 29/53974; Y10T 29/53978; F16C 43/06
  See application file for complete search history.

(56) References Cited

FOREIGN PATENT DOCUMENTS

| | | | |
|---|---|---|---|
| JP | 11-301850 A | | 11/1999 |
| JP | 2004-068838 A | | 3/2004 |
| JP | 2004068838 A | * | 3/2004 |
| JP | 2007-160414 A | | 6/2007 |
| JP | 2008-068374 A | | 3/2008 |
| JP | 2008068374 A | * | 3/2008 |
| JP | 2009-150491 A | | 7/2009 |
| JP | 2010-214537 A | | 9/2010 |

OTHER PUBLICATIONS

International Search Report and Written Opinion dated Mar. 26, 2013, from the corresponding PCT/JP2013/053262.
International Preliminary Examination Report dated Feb. 4, 2014, from the corresponding PCT/JP2013/053262.

* cited by examiner

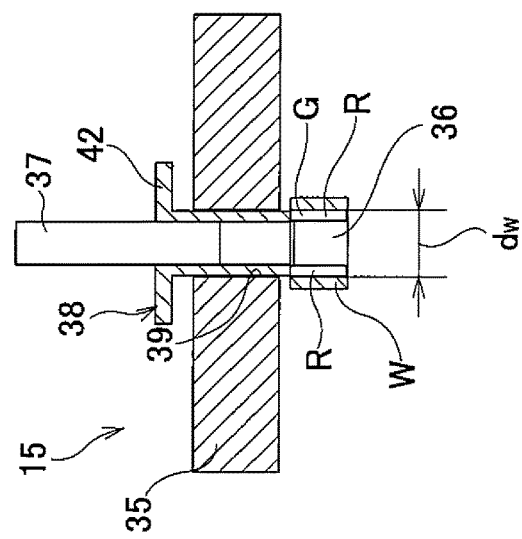
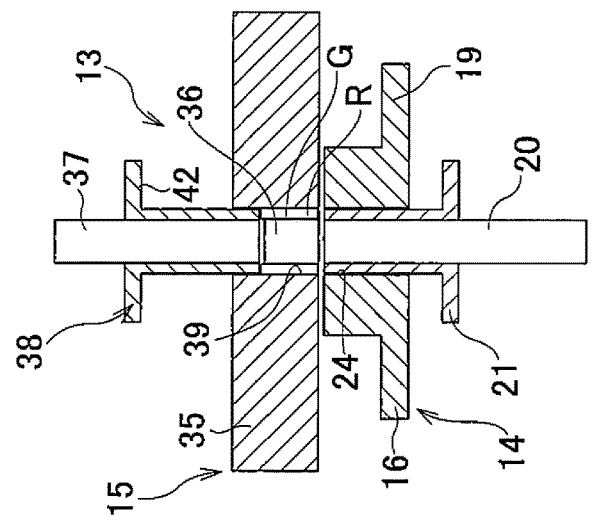
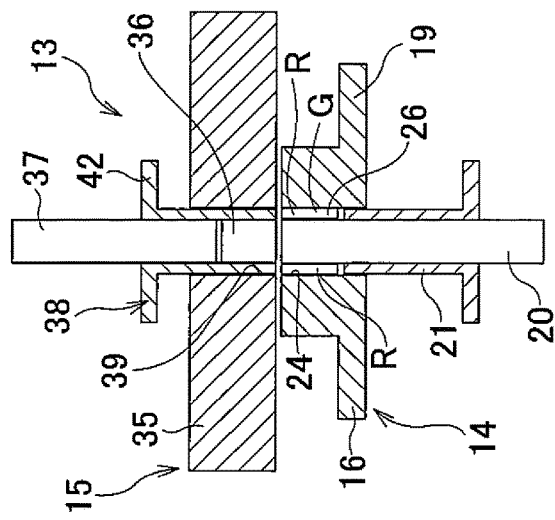
Fig.8 (A)
Fig.8 (B)
Fig.8 (C)

ROLLER ALIGNMENT DEVICE AND ROLLER ALIGNMENT METHOD

TECHNICAL FIELD

The present invention relates to a roller alignment device and a roller alignment method that are used when assembling a roller bearing or the like having plural rollers, and that align rollers in an annular shape in order to assemble the rollers inside the outer ring of a roller bearing.

BACKGROUND ART

A radial roller bearing is assembled in a rotational support section for supporting a rotating shaft, while at the same time supporting large radial loads. When it is necessary for this rotational support section to support larger radial loads, a so-called full-roller radial roller bearing that is capable of increased load capacity without the use of a retainer is used.

Various kinds of assembly apparatuses and jigs have been conventionally used in order to assemble a full-roller radial roller bearing. FIG. 11 illustrates an assembly apparatus having conventional construction that is disclosed in JP H05-329721 (A). This assembly apparatus 1 has an alignment guide member 2, a guide bar 3, a pressing cylinder 4, a roller supply means 5, a shutter member 6 and a pair of chuck members 7a, 7b.

A through hole 8 that has a funnel-shaped receiving section in the top portion is provided in the alignment guide member 2, and passes in the axial direction through the center of the alignment guide member 2. The guide bar 3 is arranged in the vertical direction (up-down direction in FIG. 11) such that the base-end section thereof is connected to the output shaft 10 of an electric motor 9, and the tip-end section thereof is gently inserted inside the through hole 8. Plural grooves 11 that are uniformly spaced in the circumferential direction are formed on the outer-circumferential surface of the tip-end section of the guide bar 3. The pressing cylinder 4 is arranged around the middle portion of the guide bar 3, and is able to displace in the axial direction relative to the guide bar 3. The roller-supply means 5 sequentially supplies a plurality of rollers R toward an annular shaped alignment space 12 that is formed between the inner-circumferential surface of the through hole 8 and the outer-circumferential surface of the guide bar 3. The shutter member 6 is provided along the bottom-end surface of the alignment guide member 2 so as to be able to move horizontally, and is able to open and close an opening on the bottom end of the through hole 8. The pair of chuck members 7a, 7b each have a concave circular arc-shaped retaining section on the surfaces that face each other, and are able to move (horizontal movement) toward or away from each other.

During operation of the assembly apparatus 1, in a state with the opening on the bottom end of the through hole 8 closed by the shutter member 6, the roller supply means 5 sequentially supplies the rollers R toward the alignment space 12 by way of the receiving section of the through hole 8. The rollers R come in contact with the outer-circumferential surface of the guide bar 3 and are rotated and guided by the rotation of the guide bar 3 so that they are aligned parallel to each other in an annular shape on the inside of the alignment space 12. After that, the annularly aligned roller group G is held by the pair of retaining sections of the chuck members 7a, 7b, and as the shutter member 6 is moved, the opening on the bottom end of the through hole 8 is exposed. Then, by causing the pressing cylinder 4 to relatively displace downward, the tip-end surface (bottom-end surface) of the pressing cylinder 4 presses the roller group G downward from the alignment space 12 on the inside of an outer ring W that is located under the alignment guide member 2.

With this assembly apparatus 1 having conventional construction, plural rollers R are aligned inside the alignment space 12, and the roller group G can be assembled all together at the same time inside the outer ring W, so it is possible to improve the work efficiency of assembling a full-roller radial roller bearing.

However, in this assembly apparatus 1, in order to align the rollers R into an annular shape, the rollers R came into metallic contact with the outer-circumferential surface of the guide bar 3, and were rotated and guided by the rotation of the guide bar 3. Therefore, there was a possibility that the rollers R could be seized or bitten between the outer-circumferential surface of the guide bar 3 and the inner-circumferential surface of the through hole 8, causing damage to the rolling surfaces of the rollers R. Particularly, grooves 11 are formed on the outer-circumferential surface of the tip-end section of the guide bar 3 in order to increase the effectiveness of rotating and guiding the rollers R, so it becomes easier for the rolling surfaces of the rollers R to become damaged. When the speed of rotation of the guide bar 3 is increased in order to shorten the work time required for aligning the rollers R, it becomes even easier to damage the roller surfaces of the rollers R, so with this assembly apparatus 1, reducing the work time for aligning the rollers R is difficult.

JP 2008-068374 (A) discloses a simplified and downsized roller-bearing assembly apparatus for aligning plural rollers in an annular shape by sequentially dropping rollers that are arranged parallel to each other in an annular alignment space that is formed between the cylindrical inner-circumferential surface of a housing and the outer-circumferential surface of a center shaft that is arranged in the horizontal direction, and then rotating and guiding the rollers by the center shaft. However, in this assembly apparatus as well, there is a similar problem in that the rollers are seized or bitten between the outer-circumferential surface of the center shaft and the inner-circumferential surface of the housing, and there is a possibility that the rolling surfaces of the rollers could be damaged.

Furthermore, with the assembly apparatus 1 having conventional construction, after the roller group G has been assembled on the inside of the outer ring W, there is a possibility that the rollers R will tilt or will drop from the inside of the outer ring W until the inner ring is assembled on the inside of the roller group G. In this regard, JP 2009-150491 (A) discloses inserting a retainer on the inside of the roller group G in a state in which the diameter of the retainer has been elastically reduced, such that the elastic force of this retainer presses the rollers R toward the outer-ring raceway that is formed around the inner-circumferential surface of the outer ring W, and holds the rollers R. However, even the case of using this retainer, in the state immediately after the roller group G has been assembled and before the retainer has been inserted, there is a possibility that the rollers R could become tilted or drop.

RELATED LITERATURE

Patent Literature

[Patent Literature 1] JP H05-329721 (A)
[Patent Literature 2] JP 2009-150491 (A)

[Patent Literature 3] JP 2008-068374 (A)

SUMMARY OF INVENTION

Problem to be Solved by Invention

The object of the present invention is to provide a roller alignment device and alignment method that effectively prevent the rolling surfaces of plural rollers from becoming damaged when aligning the rollers in an alignment space.

Means for Solving Problems

The roller alignment device of the present invention is part of an assembly apparatus for a roller bearing and is characterized by having a means for sequentially supplying plural rollers that are arranged in a row in the axial direction into an alignment space having a specified spatial shape, as well as a means for moving the rollers that are supplied into the alignment space in the lengthwise direction of the alignment space by a force acting in a direction orthogonal to the axial direction of the rollers, and aligning the plural roller so as to be in parallel to each other.

More specifically, the roller alignment device of the present invention has a main jig, a roller-supply means and an alignment-fluid-supply means. The main jig has an alignment space having a specified spatial shape such as an annular shape or a linear shape. This alignment space is constructed such that plural rollers can be aligned in the lengthwise direction in parallel to each other, and so that the width direction of the alignment space coincides with the axial direction of the rollers in the aligned state.

The roller-supply means holds the rollers in a direction that coincides with the width direction of the alignment space and is the same as the axial direction of the rollers when the rollers are aligned in the alignment space so as to be arranged in a row in the axial direction of the rollers, and sequentially supplies the rollers to a roller-supply position in the alignment space.

The alignment-fluid-supply means sprays fluid on each of the rollers that are sequentially supplied to the roller-supply position by the roller-supply means from a direction that is orthogonal to the width direction of the alignment space (roller supply direction) so that the rollers move in the lengthwise direction in the alignment space.

The main jig preferably has a push-out jig that is provided so as to be able to displace in the width direction of the alignment space relative to the other members of the main jig, with the end surface thereof being one end surface in the width direction of the alignment space.

The roller-supply means preferably has a chute section that can store the rollers therein, and a roller-supply-fluid-supply means for generating a flow of fluid inside the chute section in the direction toward the alignment space side.

The roller alignment device of the present invention can be applied to the case in which the alignment space has an annular shape and the case in which the alignment space has a linear shape.

In the case in which the alignment space has an annular shape, preferably a stopper is provided for stopping the roller of the rollers that is supplied into the alignment space first and that moves in the lengthwise direction of the alignment space before the roller-supply position.

The roller alignment method of the present invention is part of an assembly method for a roller bearing, and is characterized by having a step of sequentially supplying plural rollers that are arranged in a row in the axial direction into an alignment space having a specified spatial shape by a force acting in the axial direction of the rollers, and a step of aligning the plural rollers so as to be in parallel to each other by moving the rollers that are supplied in the alignment space in the lengthwise direction of the alignment space by a force in a direction orthogonal to the axial direction of the rollers.

In other words, the roller alignment method of the present invention is a method for aligning plural rollers so as to be in parallel to each other in the lengthwise direction of an alignment space having a specified spatial shape such as an annular shape or linear shape, that arranges the rollers in a direction that coincides with the width direction of the alignment space so as to be in a raw in the axial direction, and sequentially supplies the rollers to a roller-supply position in the alignment space in a state that the axial direction of the rollers coincides with the width direction of the alignment space, and causes the rollers to move in the lengthwise direction of the alignment space by spraying fluid on the rollers that are supplied to the roller-supply position from a direction that is orthogonal to the width direction (roller supply direction) of the alignment space.

Preferably, the roller alignment method is constructed such that, by moving a roller of the rollers that was supplied to the roller-supply position in the lengthwise direction of the alignment space and causing the roller to move away from the roller-supply position, the next roller of the rollers is supplied to the roller-supply position.

Preferably, when supplying the rollers to the roller-supply position in the alignment space, a force that acts in the axial direction of the rollers is applied to the rollers that are arranged in a row in the axial direction.

In this case, preferably, at least part of the force acting in the axial direction of the rollers is constructed by the flow of fluid in the direction toward the alignment space side, and when supplying the roller to the roller-supply position, the flow of fluid acts on the roller, and when moving the roller that was supplied to the roller-supply position in the lengthwise direction of the alignment space, the flow of fluid is temporarily stopped.

In the interpretation of the present invention, needles having a long length in the axial direction compared with the diameter (large aspect ratio) are also included in the "rollers".

Effect of Invention

With the roller alignment device and roller alignment method of the present invention, it is possible to align plural rollers in an alignment space, while at the same time effectively prevent damage from occurring to the rolling surfaces of the rollers. In other words, in the case of the present invention, plural rollers can be suitably aligned inside an alignment space by repeatedly moving the rollers in the lengthwise direction of the alignment space using the flow of fluid (fluid pressure) that is sprayed on the rollers that are supplied into the alignment space in a direction that is orthogonal to the roller supply direction instead of making the rollers rotated by a rotating shaft (guide bar), and supplying the next roller into the alignment space. Moreover, by increasing the velocity of the fluid that is sprayed toward the rollers, or by increasing the amount of spray, it is also possible to easily reduce the alignment time.

BRIEF DESCRIPTION OF DRAWINGS

FIG. 8A is a cross-sectional view of the assembly apparatus, and illustrates the state before a roller group moves from the alignment device illustrated in FIG. 1 to the insertion jig; FIG. 8B is a cross-sectional view of the assembly apparatus, and illustrates the state after the roller group has moved from the alignment device to the insertion jig; and FIG. 8C is a cross-sectional view of the assembly apparatus, and illustrates the state after the roller group and retaining member have been moved from the insertion jig and placed in an outer ring.

MODES FOR CARRYING OUT INVENTION

First Example of an Embodiment

Figure 1:
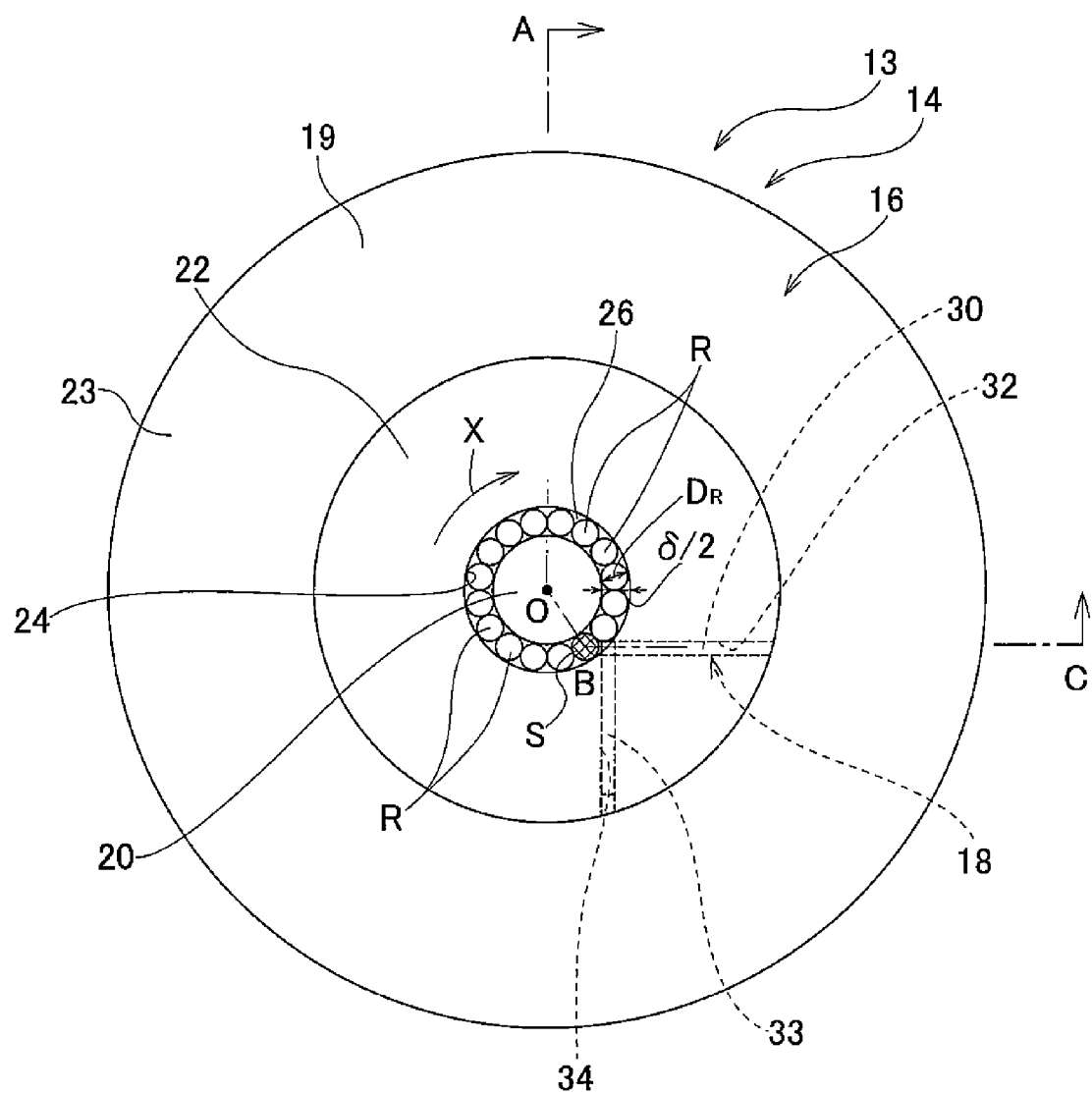
FIG. 1 is a top view of a first example of an embodiment of the present invention that schematically illustrates an alignment device of an assembly apparatus thereof, with part being omitted.

FIG. 1 to FIG. 8 illustrate a first example of an embodiment of the present invention. An assembly apparatus 13 has an alignment device 14 and an insertion jig 15, and is used for assembling plural rollers R inside an outer ring W of a full-roller radial roller bearing.

The alignment device 14 of the present invention has a main jig 16, a roller supply means 17, and an alignment-fluid supply means 18. The main jig 16 has a guide cylinder 19, a guide shaft 20, a push-out jig 21 and a cover (not illustrated in the figures), and an alignment space 26 having a specified spatial shape being formed around these members so that plural rollers can be aligned in parallel to each other.

The guide cylinder 19 has a stepped cylindrical shape, and has a thick section 22 in the half on the inner-diameter side, and a thin section 23 in the half on the outer-diameter side. A through hole 24 that passes through in the axial direction is formed in the center section of the thick section 22. The thin section 23 has a circular ring shape, and is provided so as to protrude outward in the radial direction from the outer-circumferential surface of one end section (bottom-end section) in the axial direction of the thick section 22.

Figure 4:
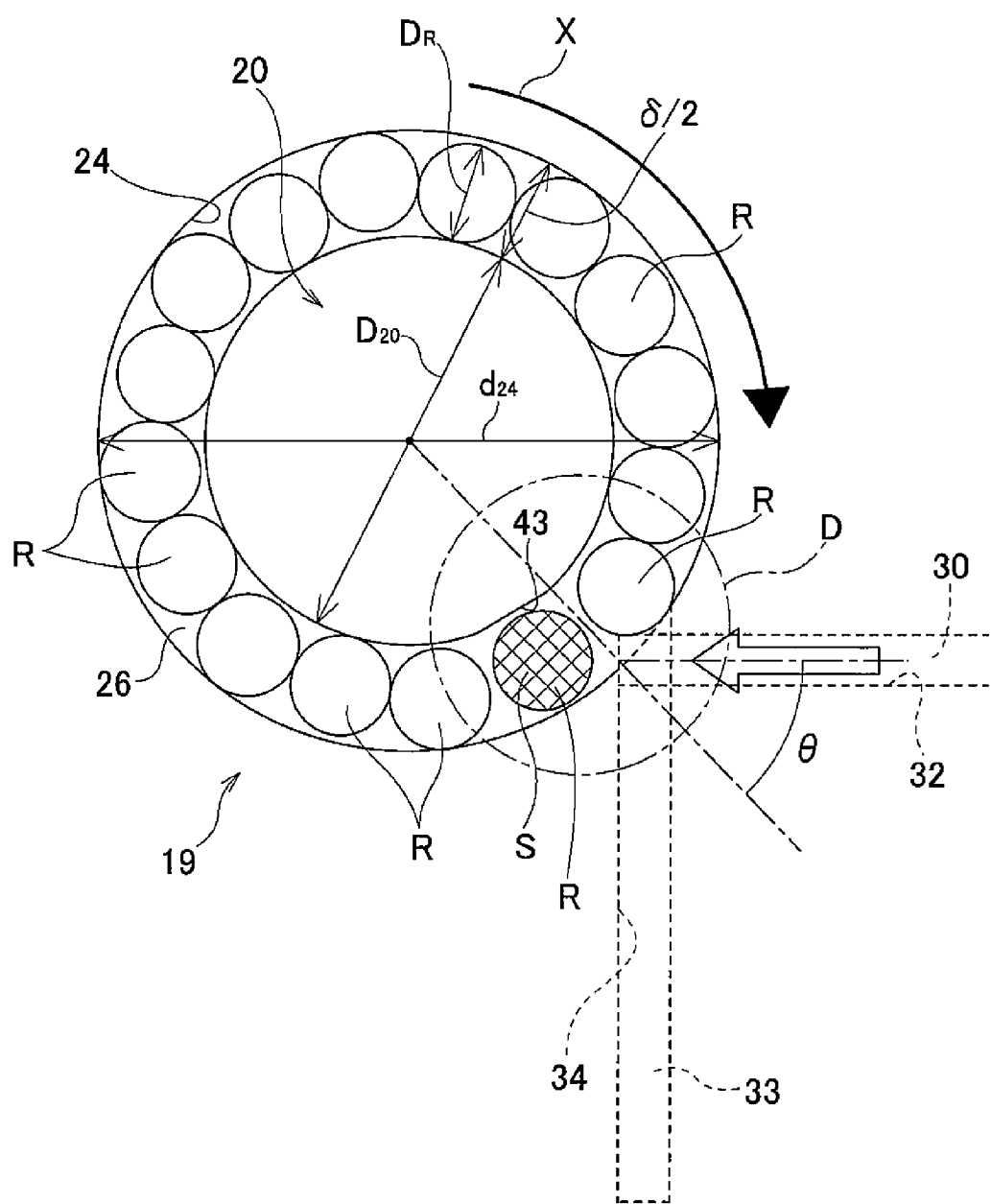
FIG. 4 is an enlarged view of the center portion in FIG. 1.
Figure 5:
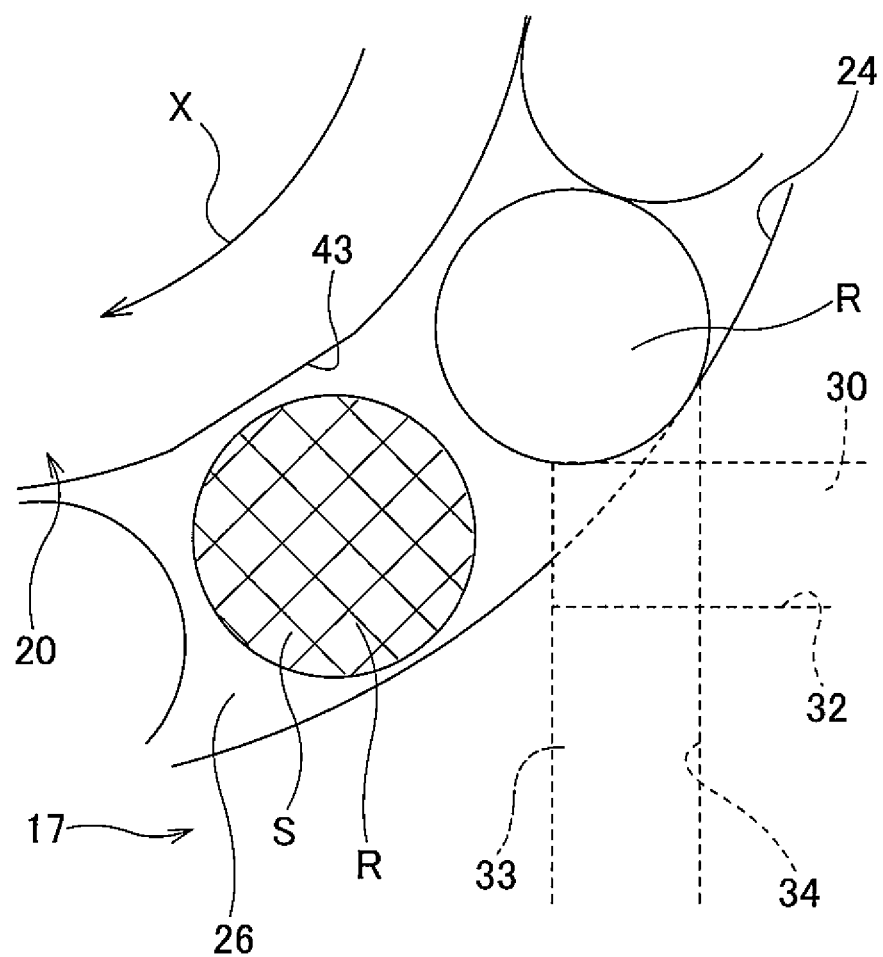
FIG. 5 is an enlarged view of part D in FIG. 4.

The guide shaft 20 has a circular column shape, and is gently inserted inside the through hole 24 so as to be concentric with the through hole 24. One half (½) of the difference δ between the inner-diameter dimension $d_{24}$ of the through hole 24 and the outer-diameter dimension $D_{20}$ of the guide shaft 20 is a little larger than the diameter $D_R$ of the rollers R ($δ/2 > D_R$). In this example, as illustrated in FIG. 4 and FIG. 5, a notch 43 is formed on one end of the outer-circumferential surface of the guide shaft 20 in the portion that faces the roller-supply position S (cross hatch portion in FIG. 1, FIG. 4 and FIG. 5), which is the position where rollers R are supplied from the roller-supply means 17. As a result, a large gap is maintained between the outer-circumferential surface (rolling surface) of a roller R that is supplied by the roller-supply means 17 and the outer-circumferential surface of the guide shaft 20, and thus when a roller R is supplied, contact between the outer-circumferential surface of the roller R and the outer-circumferential surface of the guide shaft 20 is prevented.

Figure 2:
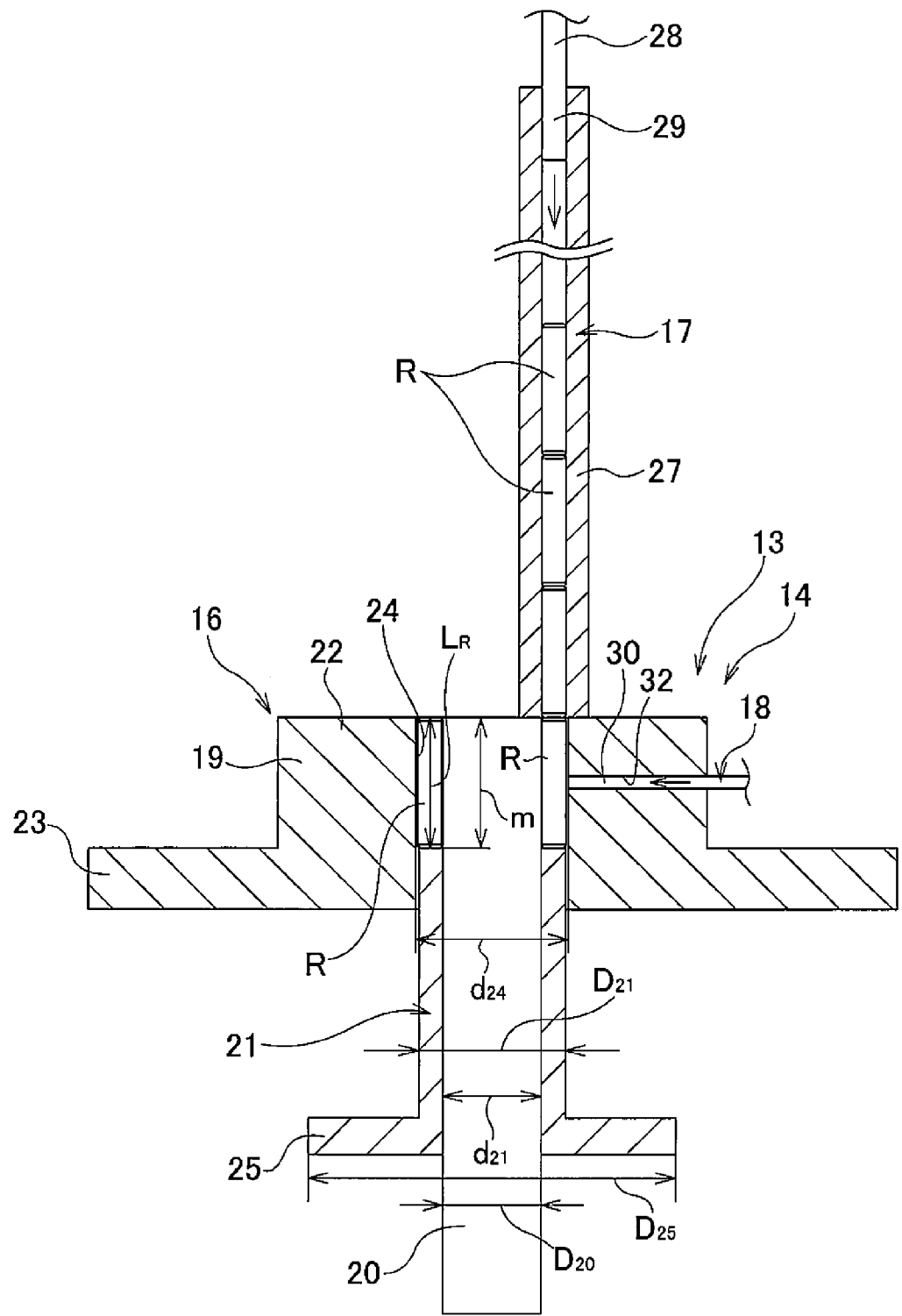
FIG. 2 is a cross-sectional view of section A-O-B-C in FIG. 1.
Figure 3:
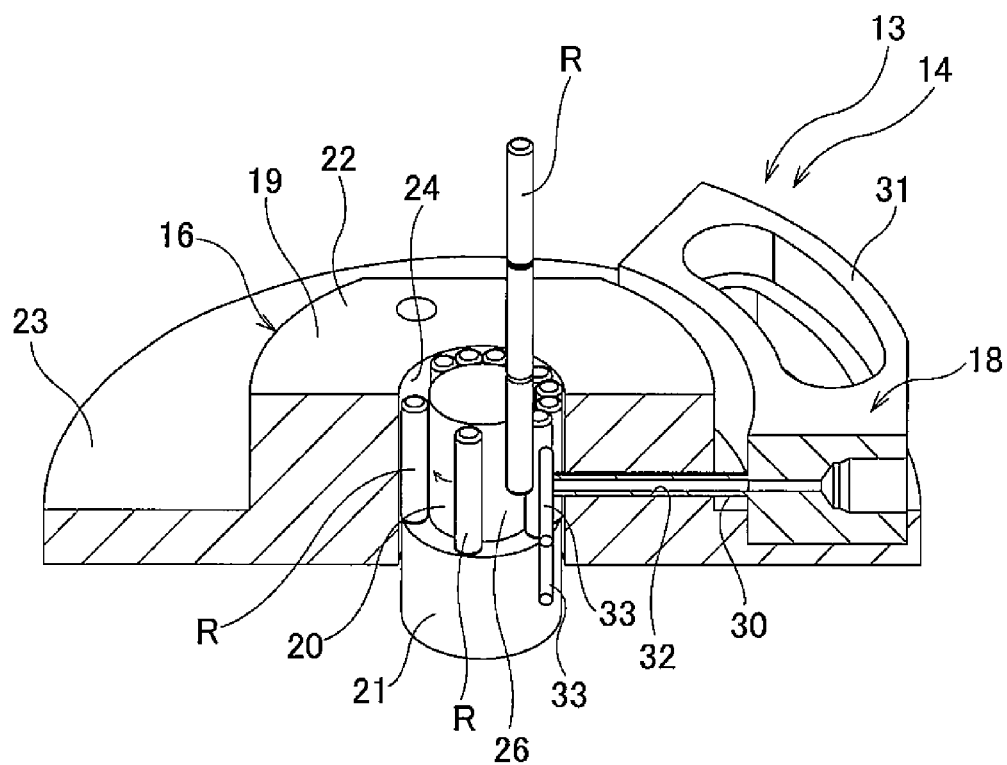
FIG. 3 is a perspective cross-sectional view that schematically illustrates the alignment device illustrated in FIG. 1, with part being omitted.

The push-out jig 21 has a cylindrical shape with a flange, and when fitted around the guide shaft 20, one end section (top-end section) in the axial direction thereof is inserted inside the through hole 24 from the bottom side of the guide cylinder 19. An outward-facing flange section 25 is provided on the other end section (bottom-end section) in the axial direction of the push-out jig 21. Of this push-out jig 21, the outer-diameter dimension $D_{21}$ of the portion that is separated in the axial direction from the outward-facing flange section 25 is a little smaller than the inner-diameter dimension $d_{24}$ of the through hole 24 ($D_{21} < d_{24}$). Moreover, the inner-diameter dimension $d_{21}$ of the push-out jig 21 is a little larger than the outer-diameter dimension $D_{20}$ of the guide shaft 20 ($d_{21} > D_{20}$). On the other hand, the outer-diameter dimension $D_{25}$ of the outward-facing flange 25 is sufficiently larger than the inner-diameter dimension $d_{24}$ of the through hole 24 ($D_{25} > d_{24}$). The push-out jig 21 is also provided so that relative displacement is possible in the axial direction (front-back direction in FIG. 1, and up-down direction in FIG. 2 and FIG. 3) with respect to the guide cylinder 19, guide shaft 20 and cover, which are the other members of the main jig 16. However, as illustrated in FIG. 2, in the state before alignment of the rollers R is completed, the position in the axial direction of the push-out jig 21 is regulated to a position where the distance "m" from one end (top end) in the axial direction thereof to the top surface of the guide cylinder 19 is a little larger than the dimension $L_R$ in the axial direction of the rollers R.

The cover is provided on the top surface of the thick section 22 of the guide cylinder 19 so as to be removable, and during operation of the alignment device 14, the cover is fastened to the top surface of the thick section 22 and covers the opening on the top end of the through hole 24. An insertion hole is provided in part of the cover for inserting the bottom-end section of a chute section 27 of the roller-supply means 17.

In this example, the annular shaped space that is formed by the inner-circumferential surface of the through hole 24 that is provided in the guide cylinder 19, the outer-circumferential surface of the guide shaft 20, the surface on one end in the axial direction of the push-out jig 21 and the bottom surface of the cover is taken to be the alignment space 26. Moreover, in this example, the alignment space 26 is annular shaped, and has a spatial shape that allows for plural rollers R to be aligned in parallel to each other in the circumferential direction, which is the lengthwise direction of the alignment space 26. With plural rollers R aligned in the alignment space 26, the width direction of the alignment space 26 coincides with the axial direction of the rollers R. The push-out jig 21 is able to displace relative to the guide cylinder 19, guide shaft 20 and cover in the width direction of the alignment space 26, which is the same direction as the axial direction of the push-out jig 21, and is such that surface of one end (top surface) in the axial direction, which is the end surface of the push-out jig 21, is able to move in the width direction (axial direction of the push-out jig 21 and the rollers R) inside the alignment space 26.

The roller-supply means 17 has a chute section 27 and a roller-supply-fluid-supply means 28, and this roller-supply means 17 holds the rollers R in a direction that coincides with the width direction of the alignment space 26 (front-rear direction in FIG. 1, and up-down direction in FIG. 2 and FIG. 3) so as to be arranged in a row in the axial direction, and sequentially supplies the rollers R into the alignment space 26. The chute section 27 has a hollow cylindrical shape and is formed in the vertical direction inside the roller-supply means 17, with the inner-diameter dimension of the chute section 27 being a little larger than the diameter $D_R$ of the rollers, and the total length being longer than or the same length in the axial direction as all of the rollers R that will be aligned in the alignment space 26 (16 rollers in this example) that are serially arranged in the axial direction. The bottom-end section of the chute section 27 is located at the top of one part in the circumferential direction of the alignment space 26 with inserted into the insertion hole that is formed in the cover. The portion (one part in the circumferential direction) of the alignment space 26 on top of which the bottom-end section of the chute section 27 is located becomes the roller-supply position S (cross hatch position in FIG. 1, FIG. 4 and FIG. 5) that is the position where the rollers R are supplied from this chute section 27 into the alignment space 26.

The roller-supply-fluid-supply means 28, by causing fluid to flow inside the chute section 27 toward the alignment space 26 side (from top to bottom), causes fluid pressure to act on the rollers R that are stored inside the chute section 27 in a direction toward the alignment space 26 side. In this example, the fluid that is supplied by the roller-supply-fluid-supply means 28 is air. In other words, the roller-supply-fluid-supply means 28 has an air-spray nozzle 29 and an actuator that is connected to a compressor, and the tip-end section of the air-spray nozzle 29 is connected to the opening on the top end of the chute section 27.

Alignment-fluid-supply means 18 causes fluid to be sprayed onto the rollers R that are supplied into the alignment space 29 by the roller-supply means 17 from a direction (from the right side to the left side in FIG. 1 to FIG. 3) that is orthogonal to the roller R supply direction (width direction of the alignment space 26). In this example, the fluid that is supplied by the alignment-fluid-supply means 18 is air. In other words, the alignment-fluid-supply means 18 has an air-spray nozzle 30 and an actuator 31 that is connected to a compressor, and the air-spray nozzle 30 is inserted inside a through hole 32 that is formed so as to connect both the inner-circumferential surface and outer-circumferential surface of the thick section 22 of the guide cylinder 19, with the tip-end section thereof facing the roller supply position S in the alignment space 26. The base-end section of the air-spray nozzle 30 is connected to an actuator 31 that is located on the top surface of the thin section 23 of the guide cylinder 19. In this example, the installation direction of the air-spray nozzle 30 is inclined at a specified angle θ (see FIG. 4) with respect to the radiation direction (radial direction) of the thick section 22. As a result, the air that is sprayed from the air-spray nozzle 30 easily flows inside the alignment space 26 in the lengthwise direction of the alignment space 26 (circumferential direction, direction of arrow X in FIG. 1, FIG. 4 and FIG. 5). Moreover, by placing the tip-end section of the air-spray nozzle 30 in the center position in the width direction of the alignment space 26, air is sprayed from the air-spray nozzle 30 toward the center position in the axial direction of the rollers R. As a result, the air pressure of the air that is sprayed from the air-spray nozzle 30 keeps the rollers R from tilting.

In this example, the actuator of the roller-supply-fluid-supply means 28 and the actuator 31 of the alignment-fluid-supply means 18 are connected to a controller, and the controller controls the operating state of each actuator. Specifically, by performing control so that the actuator of the roller-supply-fluid-supply means 28 repeatedly operates and stops (goes ON and OFF), the state of supplying air and state of not supplying air into the chute section 27 is alternately repeated at a set interval every 20 ms, every 50 ms, or every 100 ms, making the action of the fluid pressure on the rollers R intermittent. On the other hand, air is continuously supplied into the alignment space 26 by controlling the actuator 31 of the alignment-fluid-supply means 18 so that operation is continuous, continuously supplying the air into the alignment space 26.

Moreover, in this example, two stopper members 33 are provided in order to stop the roller R that is first supplied to the alignment space 26, then moves in the circumferential direction of the alignment space 26 and returns to the roller-supply position S, before the roller-supply position S. The stopper members 33 have a rod shape and are arranged on both the top and bottom sides of the air-supply nozzle 30 in parallel to the air-supply nozzle 30, in a direction so as to be orthogonal to the installation direction of the air-supply nozzle 30. In this example, the tip-end surfaces of the stopper members 33 are simple flat surfaces, however the surfaces may also be partial cylindrical concave surfaces such that the entire surface can come in contact with the outer-circumferential surface of the roller R. Furthermore, in this example, the stopper members 33 are inserted inside a pair of insertion holes 34 that are formed so as to connect both the inner-circumferential surface and outer-circumferential surface of the thick section 22 of the guide cylinder 19.

Figure 6:
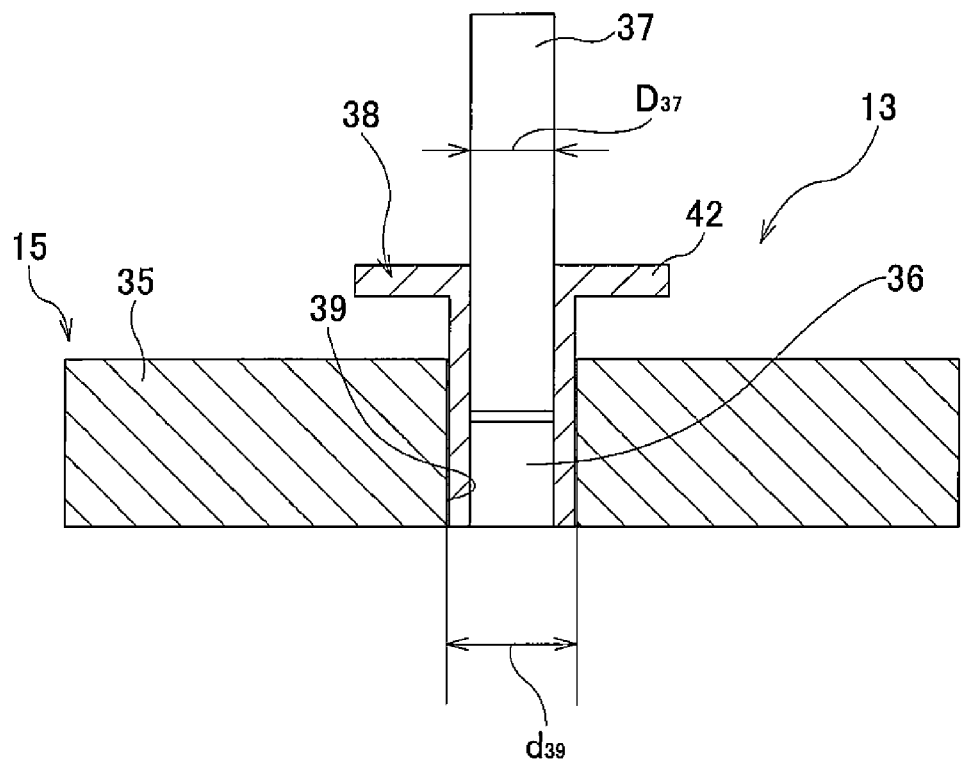
FIG. 6 is a cross-sectional view that illustrates the removed insertion jig of the assembly apparatus of the first example of an embodiment of the present invention.

As illustrated in FIG. 6 and FIG. 8, the insertion jig 15 has a guide member 35, a retaining member 36, a guide rod 37 and a push-out cylinder 38. With the retaining member 36 inserted on the inside of the roller group G that was aligned in an annular shape by the alignment device 14, the insertion jig 15 is able to simultaneously place the roller group G and retaining member 36 on the inside of an outer ring W.

A guide hole 39 is formed in the guide member 35 so as to pass through the center section in the axial direction. The inner-diameter dimension $d_{39}$ of the guide hole 39, except for errors due to manufacturing errors or the like that would not pose a functional problem, is practically equal to the inner-diameter dimension $d_{24}$ of the through hole 24 that is formed in the guide cylinder 19, and the inner-diameter dimension $d_W$ of the outer ring W ($d_{39}=d_{24}=d_W$).

Figure 7:
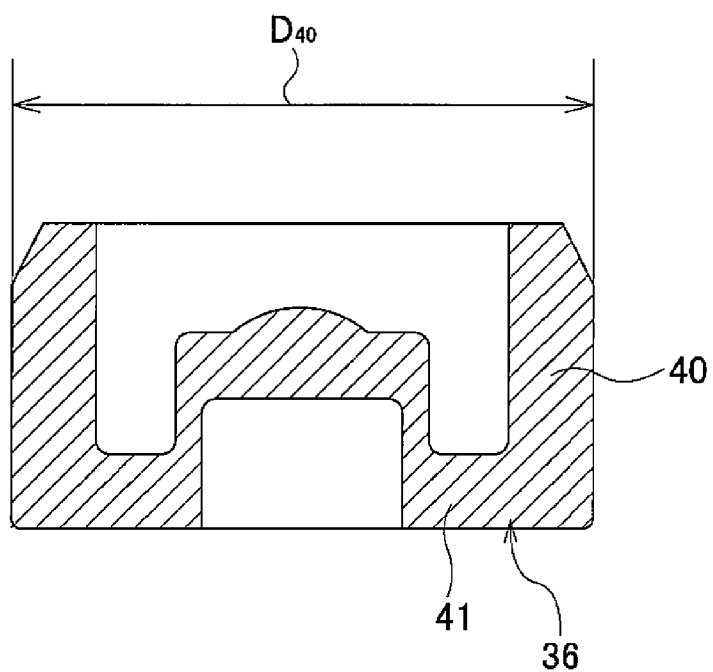
FIG. 7 is a cross-sectional view that illustrates the removed retaining member of the insertion jig of the assembly apparatus of the first example of an embodiment of the present invention.

The retaining member 36 presses the rollers R of the roller group G toward the outer-ring raceway of the outer ring W so as to hold the roller group G, and is located inside the guide hole 39. In this example, as illustrated in FIG. 7, the retaining member 36 is made of an elastic material such as rubber or synthetic resin, and has a cylindrical section 40, and a bottom section 41 that covers one end section in the axial direction of the cylindrical section 40, having a bottomed cylindrical shape. The outer-diameter dimension $D_{40}$ of the cylindrical section 40 in the free state is a little larger than the diameter of the inscribed circle of the roller group G when the roller group G is assembled inside the outer ring W or guide hole 39 and pressed against these inner circumferential surfaces. In a state in which the diameter has been elastically reduced, the retaining member 36, having construction such as this, can be inserted inside the roller group G that is inserted in the axial direction inside the guide hole 39.

The guide rod 37 has a circular column shape, and is arranged inside the guide hole 39 in series in the axial direction with the retaining member 36, and is such that the portion near the outer perimeter of the surface on one end surface in the axial direction (bottom-end surface) comes in contact with the surface on the other end surface in the axial direction (top-end surface) of the cylindrical section 40 of the retaining member 36. The outer-diameter dimension $D_{37}$ of the guide rod 37 is a little less than the outer-diameter dimension $D_{40}$ of the cylindrical section 40 of the retaining member 36 in the free state, and is practically the same as the outer-diameter dimension $D_{20}$ of the guide shaft 20 of the alignment device 14 ($D_{37}=D_{20}$).

The push-out cylinder 38 is for pushing the roller group G that has been inserted inside the guide hole 39 out from the guide hole 39 in the axial direction, and being firmly inserted inside the guide hole 39, is provided around the retaining member 36 and guide rod 37. In this example, the push-out cylinder 38 has a cylindrical shape with a flange, and one end section (bottom-end section) in the axial direction thereof is inserted inside the guide hole 39 from the top side of the guide member 35. An outward-facing flange section 42 is provided on the other end section (top-end section) in the axial direction of the push-out cylinder 38. In this example, a member having practically the same shape and dimensions as the push-out jig 21 of the alignment device 14 is used as the push-out cylinder 38.

As illustrated in FIG. 6 and FIG. 8A, in the state before the roller group G is inserted inside the guide hole 39 (state before the insertion jig 15 is operated), the surfaces of one end in the axial direction (bottom-end surfaces) of the retaining member 36 and the push-out cylinder 38 are positioned on the same plane as the surface of one end in the axial direction (bottom-end surface) of the guide member 35.

When operating the assembly apparatus 13 of this example, first, the alignment device 14 is used to align plural rollers R into an annular shape so as to be in parallel to each other. In order to do this, all of the rollers (16 rollers) are inserted in the axial direction into the alignment space 26 from the opening on the top end of the chute section 27 of the roller-supply means 17 of the alignment device 14. When inserting the rollers R, the lead (first) roller R that is inserted first is supplied from the chute section 27 to the roller-supply position S in the alignment space 26, and the remaining (second to the 16th) rollers are stored in a serial state in the axial direction inside the chute section 27.

Next, the tip-end section (bottom-end section) of the roller-supply-fluid-supply means 28 is inserted into the chute section 27, and the roller-supply-fluid-supply means 28 generates air flow inside the chute section 27 that flows toward the alignment space 26 at set intervals, while the alignment-fluid-supply means 18 continuously sprays air through the air-spray nozzle 30 from a horizontal direction that is orthogonal to the roller R supply direction (vertical direction).

As a result, a downward pushing force of air pressure from the roller-supply-fluid-supply means 28 that is added to the weight of the remaining rollers R located on the lead roller R and air pressure in the horizontal direction acts on the lead roller R. The air pressure in the vertical direction from the roller-supply-fluid-supply means 28 and the air pressure in the horizontal direction from the alignment-fluid-supply means 18 cannot move the rollers R in the horizontal direction while the force described above is pressing the roller R downward, however, when the supply of air from the roller-supply-fluid-supply means 28 is stopped, and the downward pressing force described above is reduced, it is possible to set the air pressures so as to overcome this reduced downward pressing force and cause the roller R to move in the horizontal direction. It is possible to change the air pressure from the roller-supply-fluid-supply means 28 or the air pressure from the alignment-fluid-supply means 18 according to the number of rollers R remaining in the chute section 27. These air pressures are preferably found through experimentation beforehand according to the size and weight of the rollers R and the number of rollers R that will be assembled.

While the air supply from the roller-supply-fluid-supply means 28 is stopped and the downward pressing force is reduced, the air pressure in the horizontal direction causes the lead roller R to move forward in the lengthwise direction (direction of arrow X in FIG. 1, FIG. 4 and FIG. 5) of the alignment space 26 from the roller-supply position S, and is ejected from the roller-supply position S in a moment, or a small amount of movement at a time is periodically repeated until the roller R is finally ejected from the roller-supply position S. When the position of the lead roller R is completely separated from the roller-supply position S in this way, the downward pressing force no longer acts on the roller R, so the lead roller R can be blown in the circumferential direction and moved relatively easily in the lengthwise direction of the alignment space 26 by the air sprayed from the air-spray nozzle 30 until the roller R comes in contact with the tip-end surfaces of the stopper members 33.

After the lead roller R has been separated from the roller-supply position S, the second roller R is immediately supplied from the chute section 27 by the downward pressing force that is made up of the weight of the rollers R and the air pressure of the air that is supplied from the roller-supply-fluid-supply means 28. Particularly, in this example, air pressure in the downward direction from the roller-supply-fluid-supply means 28 acts on the rollers R, so the roller-supply speed can be fast, and regardless of the air pressure that acts in the horizontal direction, it is possible to effectively prevent the posture of the roller R that is supplied to the roller-supply position S from becoming greatly tilted. The second roller R is also moved in the lengthwise direction of the alignment space 26 from the roller-supply position S by air that is sprayed from the air-spray nozzle 30 while the roller-supply-fluid-supply means 28 is stopped. In this example, by sequentially supplying rollers R to the roller-supply position S in this way and repeatedly moving the rollers R from the roller-supply position S, it is possible to align all of the rollers R (16 rollers) in the annular alignment space 26 in parallel to each other.

As described above, with all of the rollers R aligned inside the alignment space 26, the cover and roller-supply means 17 are removed from the top surface of the thick section 22 of the guide cylinder 19, and the alignment device 14 is moved to the bottom of the insertion jig 15. Specifically, as illustrated in FIG. 8A, the alignment device 14 is moved to the bottom of the insertion jig 15 so that the through hole 24 that is provided in the guide cylinder 19 of the alignment device 14 and the guide hole 39 that is provided in the guide member 35 of the insertion jig 15 become concentric. Then, from this state, the push-out jig 21 of the alignment device 14 is caused to undergo relative displacement in the upward direction. As a result, the roller group G that is aligned in an annular shape inside the alignment space 26 is pushed out in the upward direction from the alignment space 26 and removed in the axial direction. The top-end surface of the roller group G pushes the push-out cylinder 38 of the insertion jig 15 upward, and the roller group G is inserted inside the guide hole 39. As a result, the inner-circumferential surface of the guide hole 39 prevents the diameter of the roller group G from expanding, and the retaining member 36, with the diameter thereof being elastically reduced, is inserted inside the roller group G. Upward movement of the retaining member 36 is prevented by the guide rod 37.

Next, as illustrated in FIG. 8B, after the movement of the roller group G from the through hole 24 to the guide hole 39 is completely finished, then, as illustrated in FIG. 8C, the alignment device 14 is caused to move away from the bottom of the insertion jig 15, and in the place of the alignment device 14, the outer ring W, which is a race member, is put in place. After that, by causing the push-out cylinder 38 to displace downward relative to the guide member 35 and guide rod 37, the roller group G and the retaining member 36 that is inserted inside the roller group G are simultaneously pushed downward from the guide hole 39, and assembled inside the outer ring W.

In this example, not only is it possible to assemble plural rollers R inside an outer ring W in an annular shape and aligned in parallel to each other, it is also possible to effectively prevent the rollers R that are assembled inside the outer ring W from becoming tilted or dropping out from the state immediately after assembly. In other words, after using the alignment device 14 to align the rollers R, the cover is removed from the top surface of the thick section 22 of the guide cylinder 19, and in this state, by causing the push-out jig 21 to displace upward relative to the other members of the main jig 16, it is possible to easily remove just the roller group G that has been aligned in an annular shape. Therefore, it is possible to further improve the work efficiency for assembling a full-roller radial roller bearing. Furthermore, in this example, the roller group G that has been removed from inside the through hole 24 is not inserted as is inside the outer ring W, but is first moved inside the guide hole 39 of the insertion jig 15, and then with the retaining member 36 being inserted inside the roller group G, the roller group G and retaining member 36 can be assembled simultaneously inside the outer ring W. With the retaining member 36 assembled inside the outer ring W, the retaining member 36 presses the rollers R of the roller group G toward the outer-ring raceway that is formed around the inner-circumferential surface of the outer ring W and is able to hold the rollers R in place, so it is possible to effectively prevent the rollers R from tilting or dropping out from the state immediately after the rollers R have been assembled inside the outer ring W.

Moreover, in this example, when aligning plural rollers R into an annular shape, instead of performing alignment by guiding and turning the rollers R by a rotating shaft (guide bar), the rollers R are aligned by using the flow of air (air pressure) that is sprayed by the alignment-fluid-supply means 18 toward rollers R. Therefore, it is possible to align the rollers R inside the alignment space 26, while at the same time effectively prevent damage from occurring to the rolling surfaces of the rollers R. By increasing the velocity or the amount of the air that is sprayed by the alignment-fluid-supply means 18, it is also possible to easily reduce the alignment time.

Furthermore, in this example, rollers R that are housed inside the chute section 27 are pushed toward the alignment space 26 using the roller-supply-fluid-supply means 28. Therefore, it is possible to increase the speed of supplying rollers R toward the roller-supply position S when compared with the case when a roller-supply-fluid-supply means 28 is not provided, which is advantageous in reducing the alignment time. Moreover, regardless of the air pressure that acts in the horizontal direction on the rollers R, it is possible to prevent the posture of the rollers R that are supplied to the roller-supply position S from tilting. Control is performed so that supplying air and not supplying air to the chute section 27 is alternately repeated, so even without making the air pressure from the alignment-fluid-supply means 18 excessively large, it is possible to move the lead roller R from the roller-supply position S regardless of the weight of the remaining rollers R and the force pressing the lead roller R toward the top surface of the push-out jig 21 by the air pressure from the roller-supply-fluid-supply means 28. This leads to a reduction in size of these fluid-supply means, and so is advantageous in being able to make the alignment device 14 more compact and lightweight.

In this example, air that is supplied from the roller-supply-fluid-supply means 28 and the alignment-fluid supply means 18 can be discharged to the outside through ring-shaped minute gaps that are formed between the inner-circumferential surface of the guide cylinder 19 (through hole 24) and the outer-circumferential surface of the push-out jig 21, and between the outer-circumferential surface of the guide shaft 20 and the inner-circumferential surface of the push-out jig 21. Furthermore, when the cross-sectional shape of the insertion hole 32 for inserting the air-spray nozzle 30 is elliptical in order to be able adjust the spraying direction of the air-spray nozzle 30, it is possible to discharge the air from a gap between the air-spray nozzle 30 and the insertion hole 32. However, it is also possible to form a special discharge hole in part of the guide cylinder 19 for discharging the supplied air to the outside. Particularly, in the case of using water or oil as the supplied fluid, discharging the fluid to the outside using a special discharge hole is preferred, and circulating and reusing the discharged fluid as supply fluid is further preferred.

The shape of the retaining member 36 is not limited to the construction illustrated in the drawings. In other words, with the retaining member 36 inserted inside the roller group G that has been aligned into an annular shape, the retaining member 36 is sufficient as long as it presses the rollers R of the roller group G toward the race surface of the outer ring (race member) and holds the rollers R, and it is possible to use either hollow or solid construction, and it is possible to use various shapes for the cross-sectional shape in the radial direction, such as a circular shape, star shape and the like.

Furthermore, the control method used by the controller of the actuator of the roller-supply-fluid-supply means 28 and the actuator 31 of the alignment-fluid-supply means 18 is not limited to a control method in which the roller-supply-fluid-supply means 28 intermittently supplies air and the alignment-fluid-supply means 18 continuously supplies air. In other words, setting the roller-supply-fluid-supply means 28 to continuously supply air is also possible, and setting the alignment-fluid-supply means 18 to intermittently supply air is also possible. For example, after both the roller-supply-fluid-supply means 28 and the alignment-fluid-supply means 18 have continuously supplied air for a set amount of time, it is possible to switch during the process so that air is intermittently supplied. By performing this kind of control, there is constantly a flow of air in the direction toward the alignment space 26 side acting on the roller R that is inserted and dropped into the opening on the top-end of the chute section 27, so it is possible to increase the roller R supply speed, which is advantageous in making it possible to reduce the alignment time. The fluid that is supplied by the alignment-fluid-supply means 18 and the roller-supply-fluid-supply means 28 is also not limited to air, and it is also possible to use various kinds of fluid such as water or oil.

Second Example of an Embodiment

Figure 9:
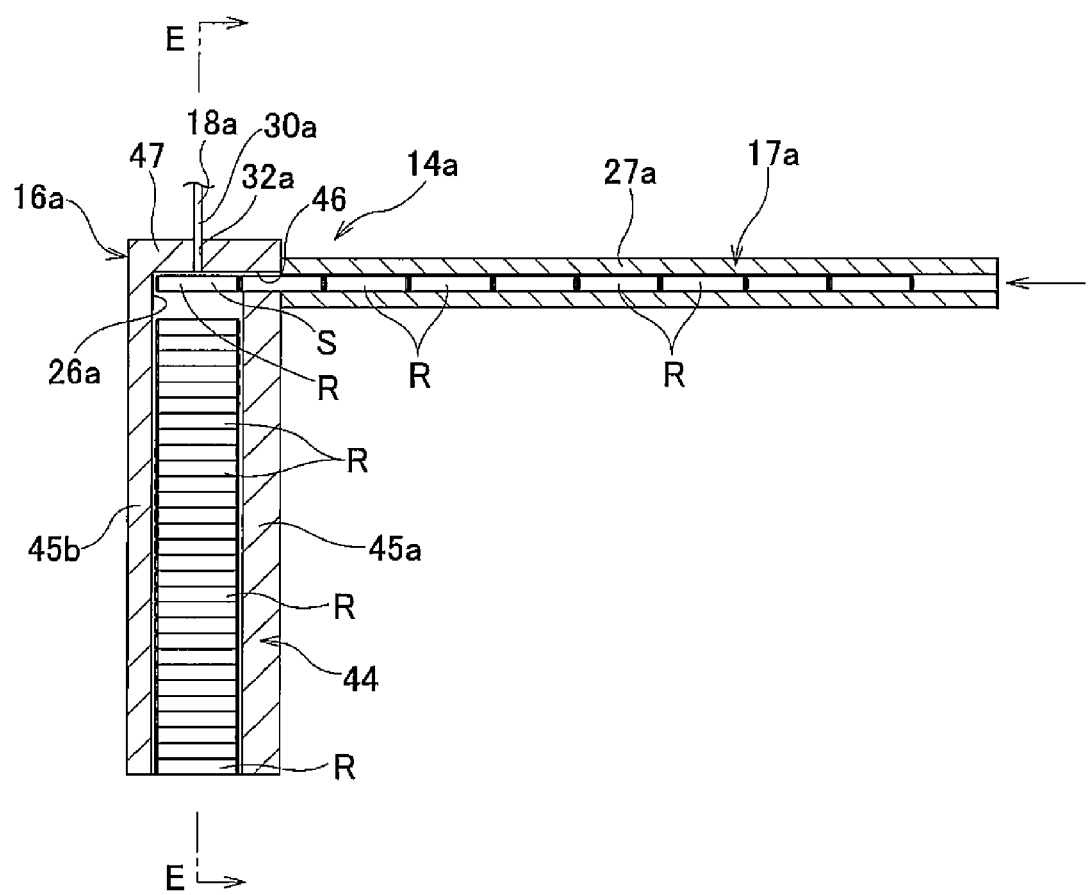
FIG. 9 is a vertical cross-sectional view of a second example of an embodiment of the present invention, and illustrates an alignment device of an assembly apparatus thereof, with part being omitted.
Figure 10:
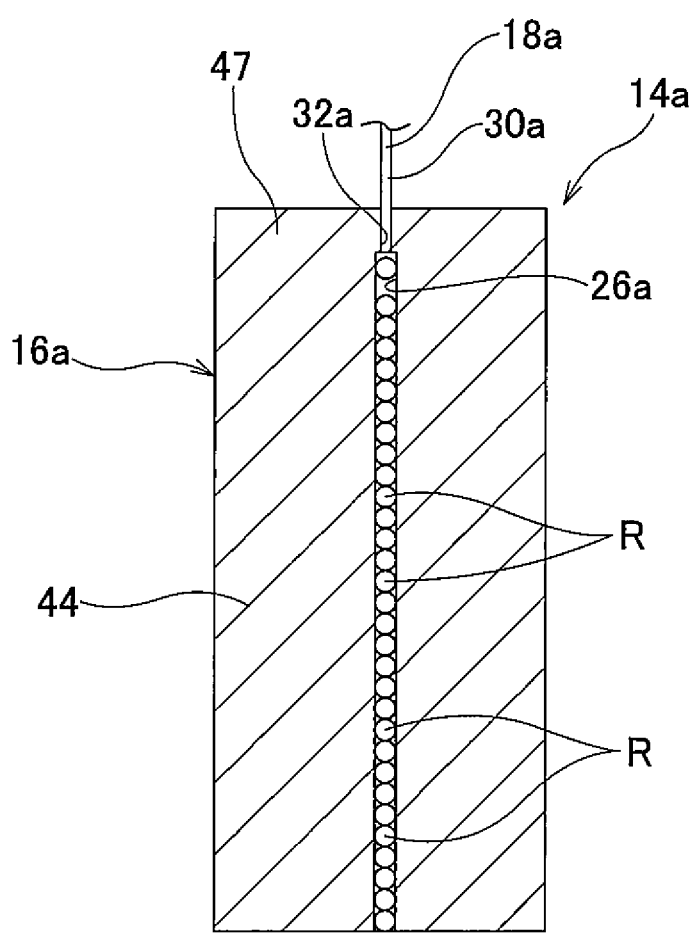
FIG. 10 is a cross-sectional view of section E-E in FIG. 9.
Figure 11:
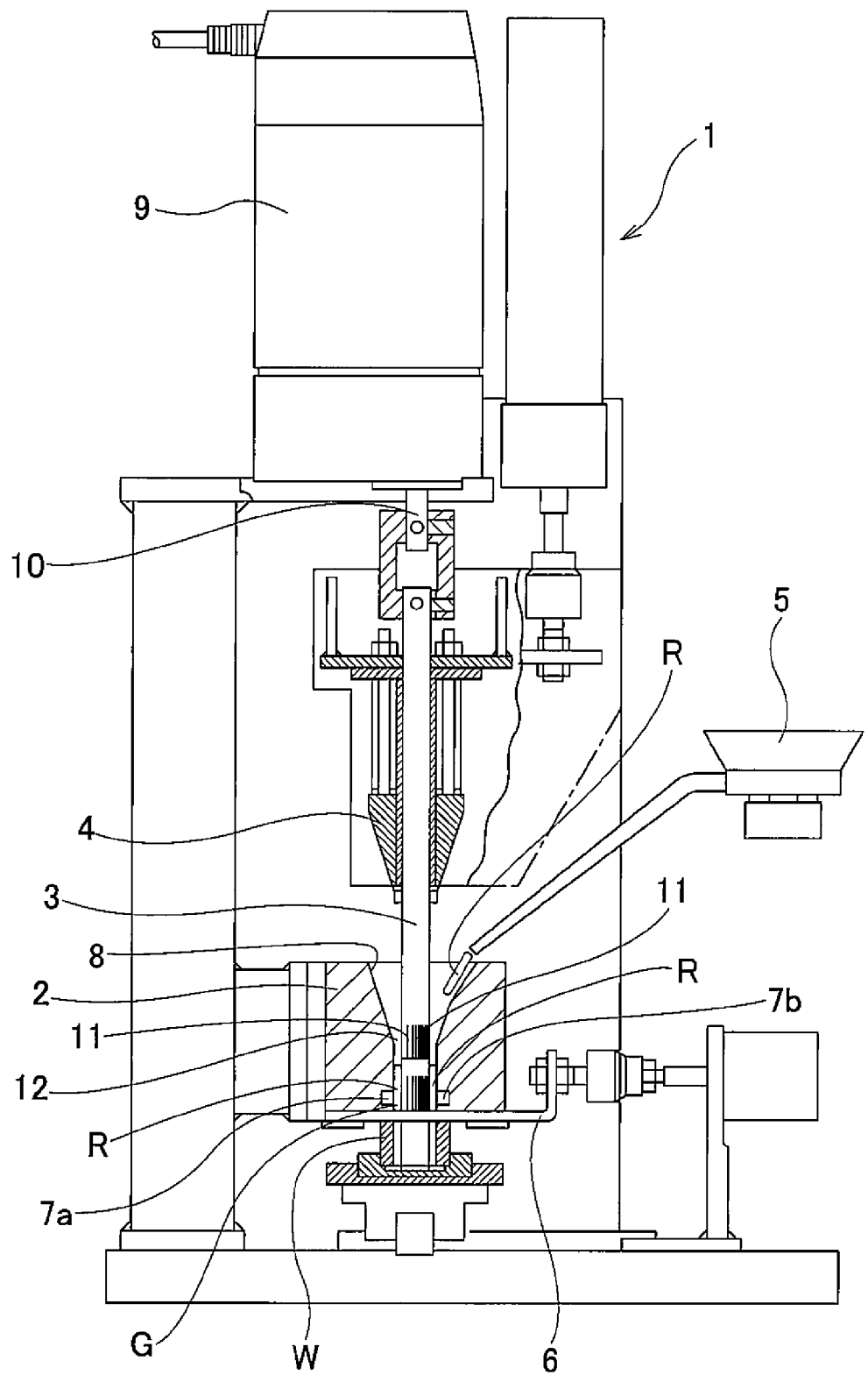
FIG. 11 is a partial cross-sectional view that illustrates an assembly apparatus for a full-roller radial roller bearing having conventional construction.

FIG. 9 and FIG. 10 illustrate a second example of an embodiment of the present invention. In this example, an alignment device 14a is used for aligning plural rollers R linearly and in parallel to each other and then supplying the rollers R into a separate device. The alignment device 14a has a main jig 16a, a roller-supply means 17a and an alignment-fluid-supply means 18a.

The main jig 16a is constructed by a single roller-supply case 44, and a linear alignment space 26a is formed inside the roller-supply case 44. In this example, the left-right direction in FIG. 9 and the front-rear direction in FIG. 10 correspond to the width direction of the alignment space 26a, and the up-down direction in FIG. 9 and FIG. 10 corresponds to the lengthwise direction thereof. An insertion hole 46 though which rollers R can be inserted is formed in one end section (top-end section in FIG. 9) in the lengthwise direction of one side wall 45a of the pair of side walls 45a, 45b of the roller-supply case 44. The bottom section of the roller-supply case 44 is connected to a separate device that is not illustrated in the drawings, and in order to supply rollers R to this separate device, the bottom-end section of the alignment space 26a is open.

The roller-supply means 17a has a chute section 27a and roller-supply-fluid-supply means (not illustrated in the drawings), and holds plural rollers R that have been arranged in a row in the axial direction, and sequentially supplies rollers R to the alignment space 26a in a direction that corresponds to the width direction (left-right direction in FIG. 9 and front-rear direction in FIG. 10) of the alignment space 26a. In order for this, the chute section 27a is arranged in the horizontal direction concentric with the insertion hole 46, and the rollers R that are housed inside this chute section 27a are supplied to the alignment space 26a through the insertion hole 46. The roller-supply-fluid-supply means of the roller-supply means 17a has the same construction as in the first example of an embodiment, and generates a flow of air inside the chute section 27a in a direction toward the alignment space 26a side, and presses the rollers R that are housed inside the chute section 27a toward the alignment space 26a.

The alignment-fluid-supply means 18a has an air-spray nozzle 30a and an actuator, and sprays air on the rollers R that are supplied into the alignment space 26a from the roller-supply means 17a from a direction (from up to down in FIG. 9 and FIG. 10) that is orthogonal to the roller R supply direction (width direction of the alignment space 26a). In order for this, an insertion hole 32a is formed in the top plate 47 of the roller-supply case 44 so as to pass through the top plate 47 in the up-down direction. The tip-end section of the air-spray nozzle 30a that is inserted inside the insertion hole 32a is made to face the roller-supply position S (top-end section of the alignment space 26a), which is the position inside the alignment space 26a where the rollers R are supplied from the chute section 27a.

In the case of using the alignment device 14a of this example as well, first, a roller R is inserted in the axial direction from the opening on one end of the chute section 27a of the roller-supply means 17a. For example, it is possible to continuously supply rollers R from a parts feeder. In this example, the roller-supply-fluid-supply means constantly generates a flow of air inside the chute section 27a in a direction toward the alignment space 26a side, supplies the lead roller R that is inserted first from the chute section 27a to the roller-supply position S inside the alignment space 26a, causes air pressure in the horizontal direction to act on the roller R and stops this roller R at the roller-supply position S. After that, the alignment-fluid supply means 18a sprays air through the air-spray nozzle 30a from above in a direction that is orthogonal to the roller R supply direction (continues to spray air).

As a result, air pressure in the horizontal direction from the roller-supply-fluid-supply means and air pressure in the downward direction act on the lead roller R. The air pressure in the downward direction overcomes the air pressure in horizontal direction that acts on the roller R and causes the roller R to move from the roller-supply position S. After the position of the lead roller R is completely separated from the roller-supply position S in this way, the force pressing in the horizontal direction no longer acts, so the lead roller R can be relatively easily moved in the lengthwise direction of the alignment space 26a by being blown by the air that is sprayed from the air-spray nozzle 30a and the gravity force that acts on the roller R.

After the lead roller R has moved away from the roller-supply position S, the second roller R is immediately supplied from the chute section 27a. Particularly, in this example, air pressure in the horizontal direction from the roller-supply-fluid-supply means constantly acts on the roller R, so regardless of the air pressure in the downward direction and the force of gravity that acts, it is possible to effectively prevent the posture of the roller R that is supplied to the roller-supply position S from becoming greatly tilted. The second roller R is also moved from the roller-supply position S in the lengthwise direction of the alignment space 26a by air that is sprayed from the air-spray nozzle 30a in the same way as the lead roller R. In this example, sequentially supplying a roller R to the roller-supply position S and moving the roller R from the roller-supply position S in this way is repeatedly performed. As a result, it is possible to sequentially supply rollers R from the opening on the bottom end of the alignment space 26a to a separate device while aligning plural rollers R parallel to each other in the linear alignment space 26a.

In this example as well, as in the first example of an embodiment, it is possible to align rollers R in the alignment space 26a while effectively preventing damage from occurring to the rolling surfaces of the rollers R.

In the case of embodying the alignment device 14a of this example as well, the control method used by the controller of the actuator of the roller-supply-fluid-supply means and the actuator 30a of the alignment-fluid-supply means 18a is not limited to a method in which the roller-supply-fluid-supply means and the alignment-fluid-supply means 18a continuously supply air. In other words, it is possible for the actuator of the roller-supply-fluid-supply means and the actuator 30a of the alignment-fluid-supply means 18a to intermittently or continuously supply air. The other construction and functions are the same as in the first example of an embodiment.

EXPLANATION OF REFERENCE NUMBERS

1 Assembly apparatus
2 Alignment guide member
3 Guide bar
4 Pressing cylinder
5 Roller-supply means
6 Shutter member 7a, 7b Chuck member
8 Through hole
9 Electric motor
10 Output shaft
11 Groove
12 Alignment space
13 Assembly apparatus
14, 14a Alignment device
15 Insertion jig
16, 16a Main jig
17, 17a Roller-supply means
18, 18a Alignment-fluid-supply means
19 Guide cylinder
20 Guide shaft
21 Push-out jig
22 Thick section
23 Thin section
24 Through hole
25 Outward-facing flange section
26, 26a Alignment space
27, 27a Chute section
28 Roller-supply-fluid-supply means
29 Air-spray nozzle
30, 30a Air-spray nozzle
31 Actuator
32, 32a Insertion hole
33 Stopper member
34 Insertion hole
35 Guide member
36 Retaining member
37 Guide rod
38 Push-out cylinder
39 Guide hole
40 Cylindrical section
41 Bottom section
42 Outward-facing flange section
43 Notch
44 Roller-supply case
45 Side wall
46 Insertion hole
47 Top plate
G Roller group
R Roller
S Roller-supply position
W Work

What is claimed is:

1. A roller alignment device, comprising:
a main jig comprising an alignment space having an annular shape capable of aligning plural rollers so as to be in parallel to each other in a circumferential direction of the alignment space, a width direction of the alignment space coinciding with an axial direction of the plural rollers in an aligned state;
a roller-supply means comprising a chute section that can store the plural rollers therein arranged in a row in the axial direction of the plural rollers and has a bottom-end section located above a roller-supply position which is one part in the circumferential direction of the alignment space, and a roller-supply-fluid-supply means for generating a flow of fluid inside the chute section in a direction toward the alignment space, and sequentially supplying the plural rollers to the roller-supply position in the alignment space; and
an alignment-fluid-supply means spraying fluid on each of the plural rollers that are supplied to the roller-supply position by the roller-supply means from a direction that is orthogonal to the width direction of the alignment space, so that the each of the plural rollers moves in the circumferential direction in the alignment space from the roller-supply position.

2. The roller alignment device according to claim 1, wherein
the main jig comprises a push-out jig that is provided so as to be able to displace in the width direction of the alignment space relative to other members of the main jig, with an end surface being one end surface in the width direction of the alignment space.

3. The roller alignment device according to claim 1, comprising stoppers for stopping a roller of the plural rollers that is supplied first into the alignment space and that moves in the circumferential direction at a position before the roller-supply position.

4. A roller alignment method for aligning plural rollers so as to be in parallel to each other in a circumferential direction of an alignment space having an annular shape; comprising steps of:
arranging the plural rollers above a roller-supply position which is one part in the circumferential direction of the alignment space so as to be in a row in an axial direction of the plural rollers;
sequentially supplying the plural rollers to the roller supply position in the alignment space by a pressing force that acts in the axial direction of the plural rollers, a part of which is constructed by a flow of fluid flowing in a direction toward the alignment space, in a state that the axial direction of the plural rollers coincides with the width direction of the alignment space;
causing one roller of the plural rollers that was supplied to the roller-supply position to move in the circumferential direction of the alignment space by spraying fluid on the one roller from a direction that is orthogonal to the width direction of the alignment space, causing the one roller to move away from the roller-supply position and supplying a next roller of the plural rollers to the roller-supply position.

5. The roller alignment method according to claim 4, wherein
when causing each of the plural rollers that was supplied to the roller-supply position to move in the circumferential direction of the alignment space, by temporarily stopping the flow of fluid, the pressing force is temporarily reduced.

* * * * *